(12) United States Patent
Resnick et al.

(10) Patent No.: US 12,260,689 B1
(45) Date of Patent: Mar. 25, 2025

(54) SYSTEM AND METHOD FOR AN ELECTRONIC LOCK WITH AN EXTERNAL POWER SOURCE

(71) Applicant: Double R Ventures LLC, Alexandria, VA (US)

(72) Inventors: Rosalind Resnick, Alexandria, VA (US); Ciro De Martino, Florence (IT)

(73) Assignee: Double R Ventures LLC, Alexandria, VA (US)

( * ) Notice: Subject to any disclaimer, the term of this patent is extended or adjusted under 35 U.S.C. 154(b) by 0 days.

(21) Appl. No.: 18/631,312

(22) Filed: Apr. 10, 2024

(51) Int. Cl.
*G07C 9/00* (2020.01)
*H02J 50/12* (2016.01)
*H02J 50/80* (2016.01)
*H02J 50/90* (2016.01)

(52) U.S. Cl.
CPC .......... *G07C 9/00174* (2013.01); *H02J 50/12* (2016.02); *H02J 50/80* (2016.02); *H02J 50/90* (2016.02); *G07C 2009/00634* (2013.01)

(58) Field of Classification Search
CPC ....... G07C 9/00174; G07C 2009/00634; H02J 50/80; H02J 50/90; H02J 50/12
USPC ......................................................... 307/104
See application file for complete search history.

(56) References Cited

U.S. PATENT DOCUMENTS

| | | | | |
|---|---|---|---|---|
| 10,683,677 | B1* | 6/2020 | Funamura | E05B 17/226 |
| 2018/0108196 | A1* | 4/2018 | Abner | G07C 9/00912 |
| 2018/0260208 | A1* | 9/2018 | Lin | G06F 8/65 |
| 2019/0169874 | A1* | 6/2019 | Gengler | E05B 9/084 |
| 2020/0265662 | A1* | 8/2020 | Maiga | G07C 9/00174 |

\* cited by examiner

*Primary Examiner* — Alfonso Perez Borroto
(74) *Attorney, Agent, or Firm* — Venable LLP; Ryan T. Ward

(57) ABSTRACT

Systems and methods for an electronic lock which is powered wirelessly from mobile power supplies, including smartphones or other mobile computing devices. A system can include: a processor; a deadbolt or a latch; an electromagnetic device physically connected to the deadbolt or latch, the electromagnetic device electrically connected to the processor; and a power receiving unit, the power receiving unit configured to receive power from a mobile power supply, the power receiving unit electrically connected to the processor, wherein, upon receiving the power at the power receiving unit from the mobile power supply: the power receiving unit converts the power into an electrical current; the electrical current powers the processor; the processor sends instructions to the electromagnetic device to move the deadbolt or latch; and the electromagnetic device in response to the instructions, moves the deadbolt or latch.

20 Claims, 5 Drawing Sheets

SYSTEM AND METHOD FOR AN ELECTRONIC LOCK WITH AN EXTERNAL POWER SOURCE

BACKGROUND

1. Technical Field

The present disclosure relates to electronic locks, and more specifically to an electronic lock which is powered from mobile power supplies including smartphones or other mobile computing devices.

2. Introduction

An electronic lock is a lock designed to lock and unlock a door when it receives a data via an electronic keypad, biometric sensor, access card, Radio Frequency Identification (RFID), Bluetooth, or Wi-Fi from a registered mobile device. While electronic locks can be quite useful, most are powered by batteries integrated into the body of the device. When those batteries run out of energy the lock may be unable to function until fresh batteries can be provided.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems and methods which provide a technical solution to the technical problem described. A method for performing the concepts disclosed herein can include: receiving, at a power receiving unit of a locking system, power from a mobile computing device; converting the power into an electrical current; powering at least one processor of the locking system using the electrical current; transmitting, from the at least one processor to an electromagnetic device of the locking system, instructions to move at least one of a deadbolt and a latch of the locking system; and moving the at least one of the deadbolt and the latch via the electromagnetic device in response to the instructions.

A system configured to perform the concepts disclosed herein can include: at least one processor; at least one of a deadbolt and a latch; at least one electromagnetic device physically connected to the at least one of the deadbolt and the latch, the at least one electromagnetic device electrically connected to the at least one processor; and at least one power receiving unit, the at least one power receiving unit configured to receive power from a mobile power supply, the at least one power receiving unit electrically connected to the at least one processor, wherein, upon receiving the power at the at least one power receiving unit from the mobile power supply: the at least one power receiving unit converts the power into an electrical current; the electrical current powers the at least one processor; the at least one processor sends instructions to the at least one electromagnetic device to move the at least one of the deadbolt and the latch; and the at least one electromagnetic device in response to the instructions, moves the at least one of the deadbolt and the latch.

DETAILED DESCRIPTION

Figure 1:
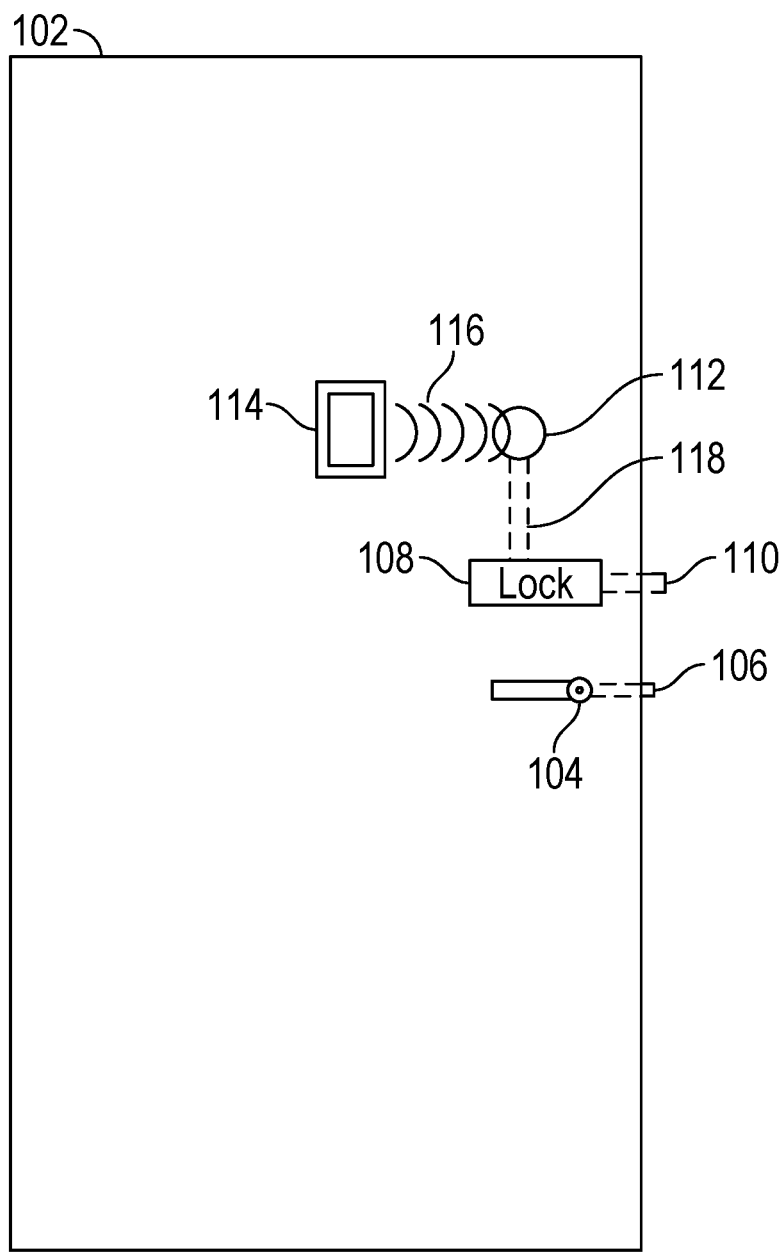
FIG. 1 illustrates an example system embodiment for wireless power transfer.

Various embodiments of the disclosure are described in detail below. While specific implementations are described, this is done for illustration purposes only. Other components and configurations may be used without parting from the spirit and scope of the disclosure.

Systems configured as disclosed herein allow users to power electronic locks using their smartphones, tablets, and/or other mobile computing devices. The power transfer from the smartphone to the electronic lock preferably occurs via a wireless power exchange (i.e., using induction), though in some configurations the power transfer can occur through a wired connection (e.g., a Universal Serial Bus (USB) connection, a Firewire/IEEE1394 connection, etc.).

Preferably, the electronic lock does not have a battery or other power supply capable of providing constant power to the electronic lock electronics. Instead, all power used by the electronic lock is provided by the user's non-integrated power supply, such as a smartphone or other mobile computing device, or a battery which is not integrated into the electronic lock. It is noted that all discussion herein with respect to a smartphone can likewise apply to other mobile computing devices, such as, but not limited to: tablet computers, speakers, headsets, laptops, earbuds, etc. Likewise, a power supply can include smartphones or other mobile computing devices, as well as a standalone power storage device such as a battery or other system capable of retaining a charge for extended periods of time (i.e., not a capacitor). Upon receiving the power from the smartphone or power supply, that power can be used to power one or more internal processors and can perform an authentication check, thereby verifying that the smartphone (or, preferably, the owner/user of the smartphone) is authorized to operate the electronic lock. Upon authenticating the user, the electronic lock can then use power received from the smartphone/power supply to power one or more actuators, allowing a deadbolt or other locking mechanism (such as, but not limited to, a latch) to turn.

The transfer of power from the smartphone to the electronic lock can occur wirelessly using induction and/or magnetic resonance. An inductive power transfer depends on close proximity between the generator of the magnetic field (in this case the smartphone or power supply) and the receiver of the magnetic field (in this case, the power receiving unit of an electronic lock). Inductive power generation relies on an inductor receiving electrical current, which results in a magnetic field. An inductor in the receiving device is placed within the magnetic field being generated, thereby creating current in the receiving device. In some configurations the generating inductor and the receiving inductor have equal impedance, whereas in other configurations the impedance can vary as needed. Magnetic resonance is the absorption or emission of electromagnetic radiation by electrons in response to application of certain magnetic fields, and may likewise be used to provide wireless power.

The transfer of power from the smartphone/power supply to the electronic lock can also occur through a wired connection. For example, upon approaching a door with an electronic lock which transfers power via a wired connection, the user may connect their phone or other device to a connector, through which the power may be transferred. Non-limiting examples of such connector can include USB-A, USB-C, Firewire/IEEE1394 connection, or other cables. In some configurations, the phone/power supply can be placed into a docking station on the door, where the wired power connection is established when the phone/power supply is successfully docked. In other configurations, the wired power connection can be a retractable cord, where the cord is coiled or otherwise stored within the door or a storage portion of the electronic lock until the user approaches. Upon approaching the door, the user can press a button, twist a knob, or otherwise interact with a connection release which allows the cable to be released. Upon finishing the power transfer and opening the door, the user may disengage the phone/power supply and initiate retraction of the cable (e.g., by pressing the button, twisting the knob, or otherwise engaging with the connection release again). In yet other configurations, there may be separate buttons (or other mechanisms) for releasing the coiled cord before usage and for initiating retraction of the cord after usage.

Regardless of whether the power transfer is wireless or wired, it is preferable that the electronic lock and its machinery/processing equipment be out of sight to the extent possible. For example, in a wireless configuration, it may be that a point on the door is identified (e.g., by a circle or other designation) as the power transfer point where a user should hold their phone (and therefore visible). If not on the door, the power transfer point could be next to the door (e.g., less than 1 meter away), such as on a wall next to the door. Other than the door handle, the other components of the lock may be located within the door frame. For a wired configuration, it may be that a docking station with a cable connection and/or a cable release point is located on the door (and therefore visible), while other components are located within the door frame. Likewise, the wired docking station could be next to the door (e.g., less than 1 meter away), such as on a wall next to the door.

Authentication that the user of the phone should be able to unlock a door can use any form of authentication known to those of skill in the art. In some configurations, a phone may be required to be unlocked (using facial identification, fingerprint identification, a pin, a password, or other form of phone identification) before an application/computer program on the phone transmits identification data to the electronic lock. In some cases, the transfer of power can be dependent upon the electronic lock verifying/authenticating the user. For example, in some cases a $1^{st}$ portion of power can be transferred from the phone to the electronic lock, the $1^{st}$ portion of power being sufficient to power one or more processors in the electronic lock and allow those one or more processors to authenticate the user. Once the electronic lock verifies the user attempting to use the electronic lock as authenticated, the electronic lock can send a signal to the phone indicating that a $2^{nd}$ portion of power, sufficient to power the motors, gears, electric, and/or electromagnetic system of the lock (for example, a solenoid), should be sent. Upon receiving that signal, the phone can generate an additional magnetic field which transfers power to the electronic lock. The electronic lock can use this additional power to open the lock.

If not using a phone, a power supply can power the system, then the user can enter a combination, PIN (personal identification number), or other identifying data onto a series of buttons, access pad, or other input device to authenticate that the user is authorized to enter into the locked location.

The lock is, preferably, a deadbolt or a latch, though other forms of locks are within the scope of systems configured according to this disclosure.

FIG. 1 illustrates an example system embodiment for wireless power transfer. As illustrated, a door 102 has a handle 104 which turns a locking device 106. However, the door 102 also has a lock 108 embedded therein which controls a deadbolt 110 (or a latch or other locking device). A power receiving unit 112 is electrically coupled 118 to the lock. The power receiving unit 112 has one or more inductors which, upon contact with a magnetic field, can convert the magnetic field into power for one or more processors located in the lock. The power can also be used, when directed by the processor, to move the deadbolt 110, such that the deadbolt no longer locks the door 102 in place. When a smartphone 114 or other mobile computing device, or other wireless power supply, is placed near the power receiving unit 112, the smartphone 114 generates a magnetic field which is converted by the power receiving unit 112 into current which is sent to the lock 108, thereby transferring power 116 from the smartphone 114 to the lock 108.

Figure 2:
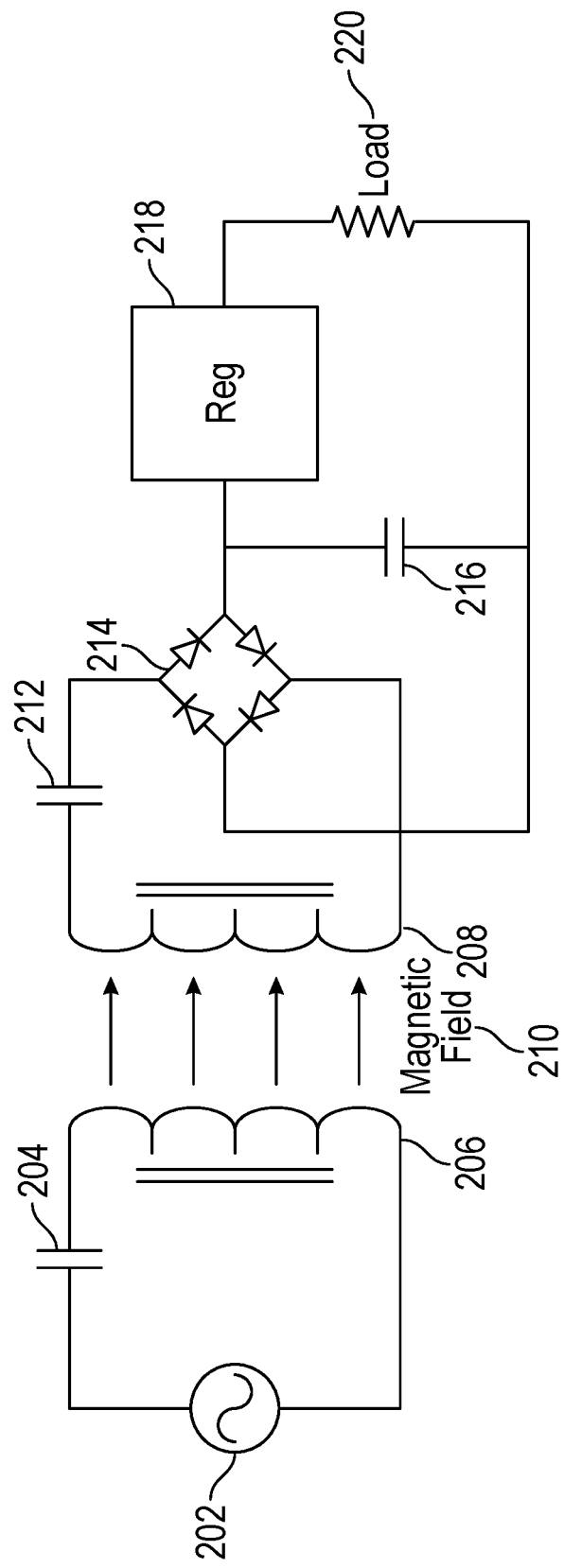
FIG. 2 illustrates an example circuit enabling wireless power transfer.

FIG. 2 illustrates an example circuit enabling wireless power transfer. Such a circuit can be used for wireless transfer of power, though in some configurations the design or specifics of the circuit can vary as needed. As illustrated and in the context of the systems disclosed herein, the left side of FIG. 2 represents a mobile computing device (or other wireless power supply) generating a magnetic field 210, which is received by the power receiving unit of the door. In this case, a signal is generated 202, which is transformed by an inductor 206 into a magnetic field 210. One or more capacitors 204 (as well as resistors, loads, or other circuit elements) can also be present. On the receiving side, another inductor 208 receives the magnetic field, then uses a combination of capacitors 212, 216, bridges 214, regulators 218, and loads 220 to transform the magnetic field 210 into usable power.

Figure 3:
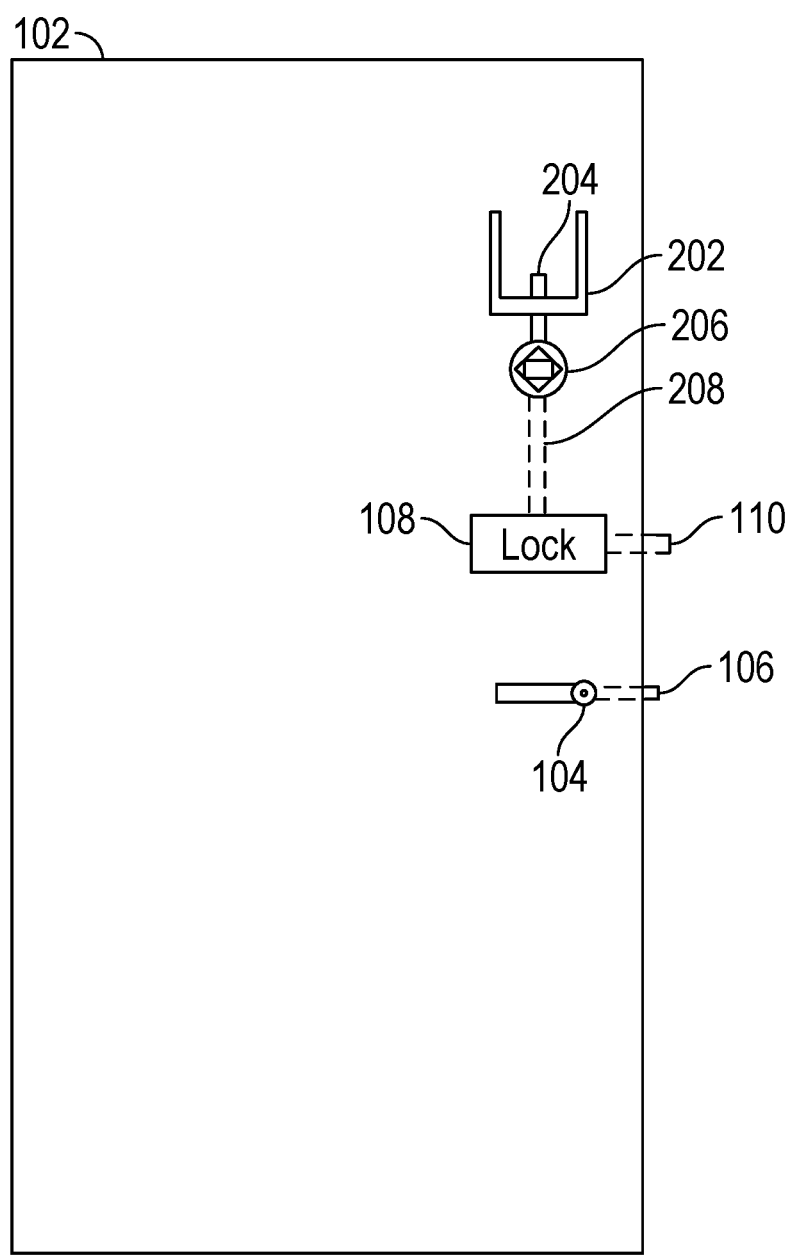
FIG. 3 illustrates an example system embodiment for wired power transfer.

FIG. 3 illustrates an example system embodiment for wired power transfer. In this example, the door 102 again has a handle 104 and a locking mechanism 106, with a lock 108 and deadbolt 110. However, in this example, the door is configured with a docking station 202, such that when the user places their smartphone (or power supply) in the docking station 202 a wired power transfer occurs, sending power from the smartphone to the lock 108. More specifically, in this example, the user can twist a knob 206, extending an electrical connector 202 into the docking station 204, the electrical connector 202 preferably being a USB connector that plugs into the smartphone or other power supply. The electrical connector 202 allows the transfer of power from the smartphone to the lock via a wired connection 208. Upon completing the power transfer and/or opening the door 102, the user can again twist the knob 206, thereby retracting the electrical connector 202 and decoupling the smartphone.

Figure 4:
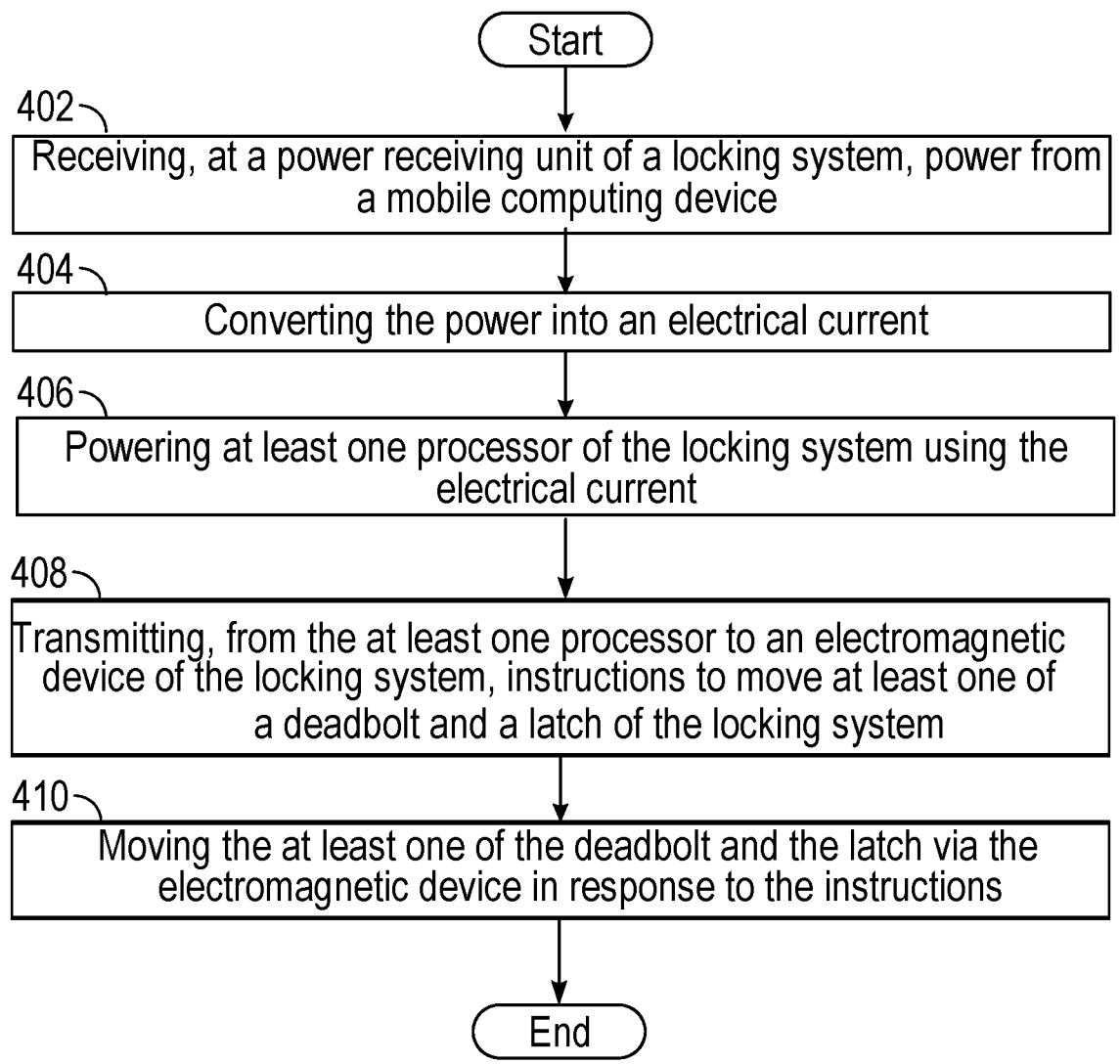
FIG. 4 illustrates an example method embodiment.

FIG. 4 illustrates an example method embodiment. As illustrated, a method performed as disclosed herein can include: receiving, at a power receiving unit of a locking system, power from a mobile computing device (402) and converting the power into an electrical current (404). The method continues by powering at least one processor of the locking system using the electrical current (406) and transmitting, from the at least one processor to an electromagnetic device of the locking system, instructions to move at least one of a deadbolt and a latch of the locking system (408). The method can then include moving the at least one of the deadbolt and the latch via the electromagnetic device in response to the instructions (410). That is, the electricity generated from, or directly provided by, the phone or other mobile computing device to the locking system can be used by the electromagnetic device to unlock the door. In some configurations, the power receiving unit can include at least one inductor configured to receive a magnetic field generated by the mobile computing device, wherein, upon receiving the magnetic field at the at least one inductor: the at least one inductor converts the magnetic field into the electrical current.

The electromagnetic device to unlock the door can be any form or number of electric and/or electromagnetic devices, such as (but not limited to) a motor and/or a solenoid device.

In some configurations, the power receiving unit can include at least one wired electrical connector which can be electrically coupled to the mobile computing device. In such configurations, the at least one wired electrical connector can be a Universal Serial Bus (USB) connector. Similarly, the locking system can further include a docking station configured to hold the mobile computing device in place while the at least one wired electrical connector couples to the mobile computing device. Likewise, the locking system can further include a connector release which, when physically manipulated, releases a predetermined amount of wire which connects the at least one processor and the at least one wired electrical connector. The physical manipulation of the connector release can include at least one of a button press or a twist.

In some configurations the locking system is associated with a door, such that moving the deadbolt causes the door to lock or unlock.

In some configurations, all electrical power for the locking system comes from the power provided by the mobile computing device.

In some configurations, the at least one power receiving unit is located on an exterior surface of a door; and wherein the deadbolt, the at least one motor and the at least one processor are embedded within the door such that the at least one motor and the at least one processor are not visible when the door is installed.

In some configurations, the method can further include, upon the receiving of the power at the at least one power receiving unit from the mobile computing device: a data receiver receiving an authentication signal from the mobile computing device; and the at least one processor verifying the authentication signal prior to the at least one processor sending the instructions to the electromagnetic device to move the deadbolt.

Figure 5:
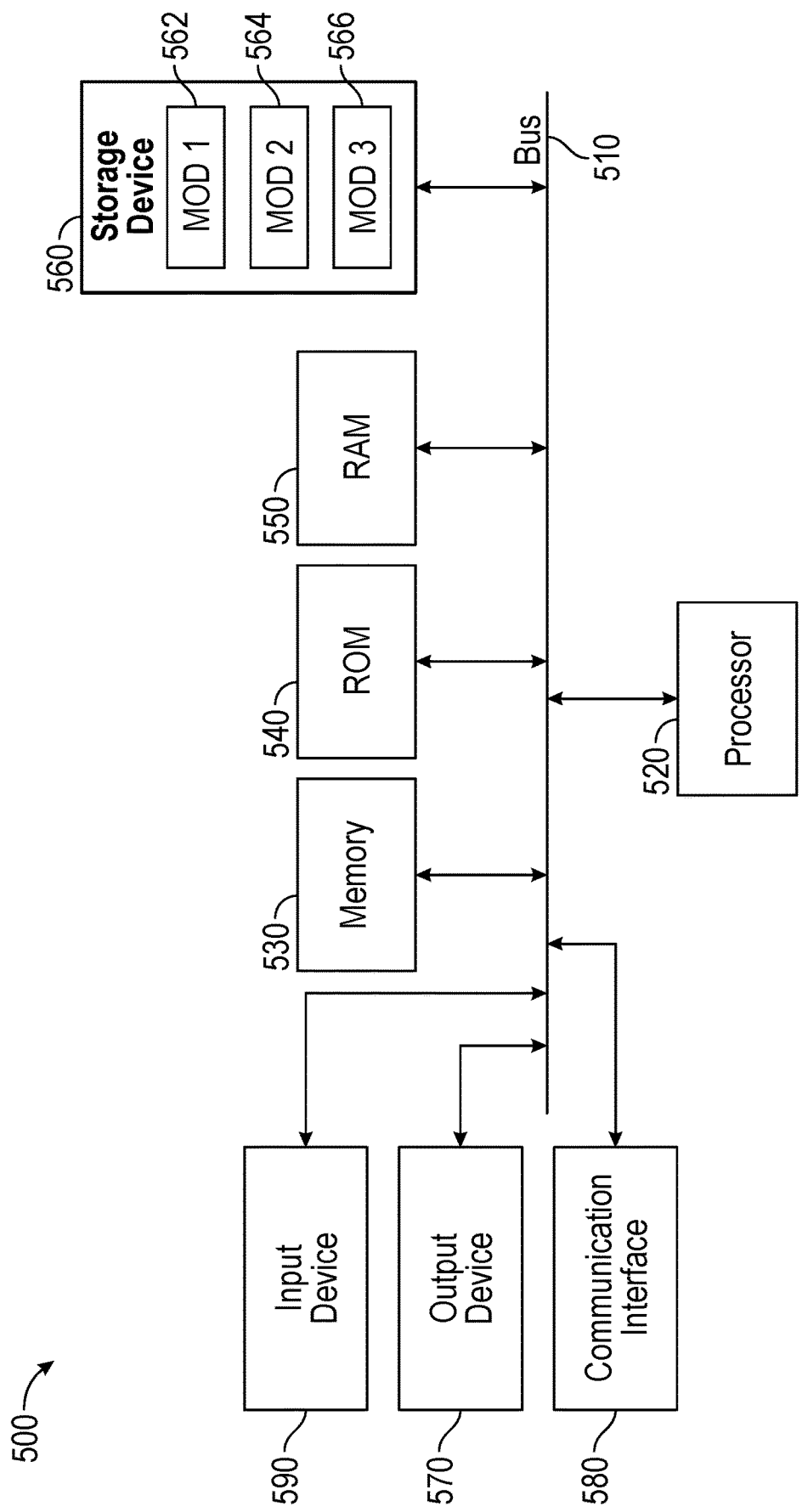
FIG. 5 illustrates an example computer system.

With reference to FIG. 5, an exemplary system includes a computing device 500 (such as a general-purpose computing device), including a processing unit (CPU or processor) 520 and a system bus 510 that couples various system components including the system memory 530 such as read-only memory (ROM) 540 and random access memory (RAM) 550 to the processor 520. The computing device 500 can include a cache of high-speed memory connected directly with, in close proximity to, or integrated as part of the processor 520. The computing device 500 copies data from the system memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The system memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general-purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in memory ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide non-volatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, system bus 510, output device 570 (such as a display or speaker), and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 500 is a small, handheld computing device, a desktop computer, or a computer server.

Although the exemplary embodiment described herein employs the storage device 560 (such as a hard disk), other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A system comprising: at least one processor; at least one of a deadbolt and a latch; at least one electromagnetic device physically connected to the at least one of the deadbolt and the latch, the at least one electromagnetic device electrically connected to the at least one processor; and at least one power receiving unit, the at least one power receiving unit configured to receive power from a mobile power supply, the at least one power receiving unit electrically connected to the at least one processor, wherein, upon receiving the power at the at least one power receiving unit from the mobile power supply: the at least one power receiving unit converts the power into an electrical current; the electrical current powers the at least one processor; the at least one processor sends instructions to the at least one electromagnetic device to move the at least one of the deadbolt and the latch; and the at least one electromagnetic device in response to the instructions, moves the at least one of the deadbolt and the latch.

The system of any preceding clause, wherein the mobile power supply is a mobile computing device.

The system of any preceding clause, wherein the at least one power receiving unit comprises at least one inductor configured to receive a magnetic field generated by the mobile computing device, wherein, upon receiving the magnetic field at the at least one inductor: the at least one inductor converts the magnetic field into the electrical current.

The system of any preceding clause, wherein the at least one power receiving unit comprises at least one wired electrical connector which can be electrically coupled to the mobile power supply.

The system of any preceding clause, wherein the at least one wired electrical connector comprises a Universal Serial Bus (USB) connector.

The system of any preceding clause, further comprising: a docking station configured to hold the mobile computing device in place while the at least one wired electrical connector couples to the mobile computing device.

The system of any preceding clause, further comprising: a connector release which, when physically manipulated, releases a predetermined amount of wire which connects the at least one processor and the at least one wired electrical connector.

The system of any preceding clause, wherein physical manipulation of the connector release comprises at least one of a button press or a twist.

The system of any preceding clause, wherein the system is associated with a door, such that moving the at least one of the deadbolt and the latch causes the door to lock or unlock.

The system of any preceding clause, wherein all electrical power for the system comes from the power provided by the mobile power supply.

The system of any preceding clause, wherein the at least one power receiving unit is located on an exterior surface of a door; and wherein the at least one of the deadbolt and the latch, the at least one electromagnetic device, and the at least one processor are embedded within the door, such that the at least one electromagnetic device and the at least one processor are not visible when the door is installed.

The system of any preceding clause, wherein the at least one power receiving unit is located on a surface next to a door, the surface being within one meter of the door; and wherein the at least one of the deadbolt and the latch, the at least one electromagnetic device, and the at least one processor are embedded within the door, such that the at least one electromagnetic device and the at least one processor are not visible when the door is installed.

The system of any preceding clause, further comprising: a data receiver; and wherein, upon the receiving of the power at the at least one power receiving unit from the mobile computing device: the data receiver receives an authentication signal from the mobile computing device; and the at least one processor verifies the authentication signal prior to the at least one processor sending the instructions to the at least one electromagnetic device to move the at least one of the deadbolt and the latch.

The system of any preceding clause, further comprising: a keypad; and wherein, upon the receiving of the power at the at least one power receiving unit from the mobile power supply; the keypad receives a manually entered authentication signal; and the at least one processor verifies the authentication signal prior to the at least one processor sending the instructions to the at least one electromagnetic device to move the at least one of the deadbolt and the latch.

A method comprising: receiving, at a power receiving unit of a locking system, power from a mobile computing device; converting the power into an electrical current; powering at least one processor of the locking system using the electrical current; transmitting, from the at least one processor to an electromagnetic device of the locking system, instructions to move at least one of a deadbolt and a latch of the locking system; and moving the at least one of the deadbolt and the latch via the electromagnetic device in response to the instructions.

The method of any preceding clause, wherein the power receiving unit comprises at least one inductor configured to receive a magnetic field generated by the mobile computing device, wherein, upon receiving the magnetic field at the at least one inductor: the at least one inductor converts the magnetic field into the electrical current.

The method of any preceding clause, wherein the power receiving unit comprises at least one wired electrical connector which can be electrically coupled to the mobile computing device.

The method of any preceding clause, wherein the at least one wired electrical connector comprises a Universal Serial Bus (USB) connector.

The method of any preceding clause, wherein the locking system further comprises a docking station configured to hold the mobile computing device in place while the at least one wired electrical connector couples to the mobile computing device.

The method of any preceding clause, wherein the locking system further comprises a connector release which, when physically manipulated, releases a predetermined amount of wire which connects the at least one processor and the at least one wired electrical connector.

We claim:

1. A system comprising:
   at least one processor;
   at least one of a deadbolt and a latch;
   at least one electromagnetic device physically connected to the at least one of the deadbolt and the latch, the at least one electromagnetic device electrically connected to the at least one processor; and
   at least one power receiving unit, the at least one power receiving unit configured to receive power from a mobile power supply, the at least one power receiving unit electrically connected to the at least one processor,
   wherein, upon receiving the power at the at least one power receiving unit from the mobile power supply:
      the at least one power receiving unit converts the power into an electrical current;
      the electrical current powers the at least one processor;
      the at least one processor sends instructions to the at least one electromagnetic device to move the at least one of the deadbolt and the latch; and
      the at least one electromagnetic device in response to the instructions, moves the at least one of the deadbolt and the latch.

2. The system of claim 1, wherein the mobile power supply is a mobile computing device.

3. The system of claim 2, wherein the at least one power receiving unit comprises at least one inductor configured to receive a magnetic field generated by the mobile computing device, wherein, upon receiving the magnetic field at the at least one inductor:
   the at least one inductor converts the magnetic field into the electrical current.

4. The system of claim 2, wherein the at least one power receiving unit comprises at least one wired electrical connector which can be electrically coupled to the mobile power supply.

5. The system of claim 4, wherein the at least one wired electrical connector comprises a Universal Serial Bus (USB) connector.

6. The system of claim 4, further comprising:
   a docking station configured to hold the mobile computing device in place while the at least one wired electrical connector couples to the mobile computing device.

7. The system of claim 4, further comprising:
   a connector release which, when physically manipulated, releases a predetermined amount of wire which connects the at least one processor and the at least one wired electrical connector.

8. The system of claim 7, wherein physical manipulation of the connector release comprises at least one of a button press or a twist.

9. The system of claim 1, wherein the system is associated with a door, such that moving the at least one of the deadbolt and the latch causes the door to lock or unlock.

10. The system of claim 1, wherein all electrical power for the system comes from the power provided by the mobile power supply.

11. The system of claim 1, wherein the at least one power receiving unit is located on an exterior surface of a door; and
   wherein the at least one of the deadbolt and the latch, the at least one electromagnetic device, and the at least one processor are embedded within the door, such that the at least one electromagnetic device and the at least one processor are not visible when the door is installed.

12. The system of claim 1, wherein the at least one power receiving unit is located on a surface next to a door, the surface being within one meter of the door; and
   wherein the at least one of the deadbolt and the latch, the at least one electromagnetic device, and the at least one processor are embedded within the door, such that the at least one electromagnetic device and the at least one processor are not visible when the door is installed.

13. The system of claim 2, further comprising:
   a data receiver; and
   wherein, upon the receiving of the power at the at least one power receiving unit from the mobile computing device:
      the data receiver receives an authentication signal from the mobile computing device; and
      the at least one processor verifies the authentication signal prior to the at least one processor sending the instructions to the at least one electromagnetic device to move the at least one of the deadbolt and the latch.

14. The system of claim 1, further comprising:
   a keypad; and
   wherein, upon the receiving of the power at the at least one power receiving unit from the mobile power supply:
      the keypad receives a manually entered authentication signal; and
      the at least one processor verifies the authentication signal prior to the at least one processor sending the instructions to the at least one electromagnetic device to move the at least one of the deadbolt and the latch.

15. A method comprising:

receiving, at a power receiving unit of a locking system, power from a mobile computing device;

converting the power into an electrical current;

powering at least one processor of the locking system using the electrical current;

transmitting, from the at least one processor to an electromagnetic device of the locking system, instructions to move at least one of a deadbolt and a latch of the locking system; and moving the at least one of the deadbolt and the latch via the electromagnetic device in response to the instructions.

16. The method of claim 15, wherein the power receiving unit comprises at least one inductor configured to receive a magnetic field generated by the mobile computing device, wherein, upon receiving the magnetic field at the at least one inductor:

the at least one inductor converts the magnetic field into the electrical current.

17. The method of claim 15, wherein the power receiving unit comprises at least one wired electrical connector which can be electrically coupled to the mobile computing device.

18. The method of claim 17, wherein the at least one wired electrical connector comprises a Universal Serial Bus (USB) connector.

19. The method of claim 17, wherein the locking system further comprises a docking station configured to hold the mobile computing device in place while the at least one wired electrical connector couples to the mobile computing device.

20. The method of claim 17, wherein the locking system further comprises a connector release which, when physically manipulated, releases a predetermined amount of wire which connects the at least one processor and the at least one wired electrical connector.

* * * * *